(12) United States Patent
Togashi et al.

(10) Patent No.: US 8,404,999 B2
(45) Date of Patent: Mar. 26, 2013

(54) LASER PROCESSING APPARATUS

(75) Inventors: Ken Togashi, Ota-Ku (JP); Keiji Nomaru, Ota-Ku (JP); Hiroshi Morikazu, Ota-Ku (JP)

(73) Assignee: Disco Corporation, Tokyo (JP)

( * ) Notice: Subject to any disclaimer, the term of this patent is extended or adjusted under 35 U.S.C. 154(b) by 118 days.

(21) Appl. No.: 12/899,757

(22) Filed: Oct. 7, 2010

(65) Prior Publication Data

US 2011/0084050 A1 Apr. 14, 2011

(30) Foreign Application Priority Data

Oct. 9, 2009 (JP) ................. 2009-235539

(51) Int. Cl.
*B23K 26/38* (2006.01)
*B23K 26/067* (2006.01)
(52) U.S. Cl. ............. 219/121.67; 219/121.76
(58) Field of Classification Search ........... 219/121.67, 219/121.68, 121.76, 121.77, 121.75
See application file for complete search history.

(56) References Cited

U.S. PATENT DOCUMENTS

| | | | |
|---|---|---|---|
| 6,562,698 B2 * | 5/2003 | Manor | 438/460 |
| 2002/0108935 A1 * | 8/2002 | Schad et al. | 219/121.67 |
| 2007/0228020 A1 * | 10/2007 | Oba | 219/121.67 |
| 2010/0252543 A1 * | 10/2010 | Manens et al. | 219/121.68 |

FOREIGN PATENT DOCUMENTS

| | | |
|---|---|---|
| JP | 10-305420 | 11/1998 |
| WO | WO 02/094528 A1 | 11/2002 |
| WO | WO-2008/056116 A1 * | 5/2008 |

* cited by examiner

*Primary Examiner* — Geoffrey S Evans
(74) *Attorney, Agent, or Firm* — Greer, Burns & Crain, Ltd.

(57) ABSTRACT

A laser processing apparatus including a laser applying unit. The laser applying unit includes a first laser oscillating unit, a second laser oscillating unit, a first laser branching unit for branching a laser beam oscillated from the first laser oscillating unit into three optical paths, a second laser branching unit for branching a laser beam oscillated from the second laser oscillating unit into three optical paths, three first focusing units for respectively focusing the laser beams through the three optical paths obtained by the first laser branching unit toward a glass substrate, and three second focusing units for respectively focusing the laser beams through the three optical paths obtained by the second laser branching unit. The first focusing units and the second focusing units are alternately arranged in a line in an indexing direction.

1 Claim, 13 Drawing Sheets

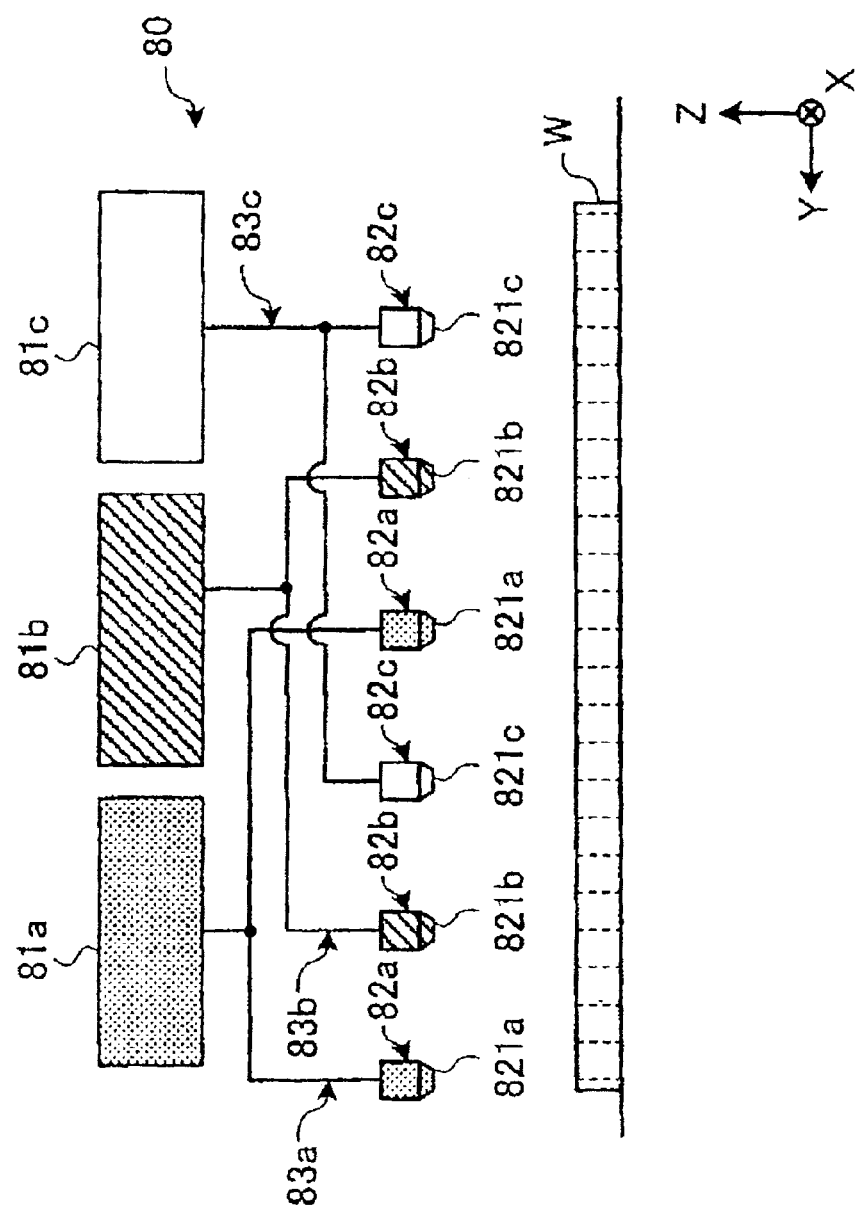

LASER PROCESSING APPARATUS

BACKGROUND OF THE INVENTION

1. Field of the Invention

The present invention relates to a laser processing apparatus for laser-processing a workpiece such as a semiconductor wafer and a glass substrate.

2. Description of the Related Art

In a fabrication process for electronic parts, a plurality of crossing work lines called streets are formed on the front side of a workpiece such as a semiconductor wafer and a glass substrate to thereby partition a plurality of regions where a plurality of functional devices are respectively formed. The workpiece thus formed with the functional devices is divided along the work lines to thereby produce the individual electronic parts.

Known is a laser processing method such that a laser beam is applied to a workpiece to thereby perform laser processing along the work lines. For example, Japanese Patent Laid-open No. 10-305420 discloses a method of applying a laser beam to a workpiece such as a wafer to thereby form a groove on the workpiece in order to cut the workpiece. Further, JP-T-2004-526335 discloses a method of applying a laser beam along scribe lines (work lines) to thereby cut a semiconductor wafer. In Patent Document 2, two laser light sources (laser oscillating means) are used and the laser beam from each laser light source is branched into a plurality of laser beams to be applied to a circuit board. More specifically, as shown in FIG. 10 of Patent Document 2, two lenses for focusing each laser beam are arranged for each laser light source. With this configuration, laser processing can be performed along a plurality of work lines at a time, thereby improving the processing efficiency.

In performing laser processing along the work lines on the workpiece, a laser applying position and/or the workpiece are/is moved in an indexing direction to thereby move the workpiece relative to the laser applying position, thus stepwise positioning the laser applying position to each work line. Accordingly, in the case of applying the configuration shown in FIG. 10 of Patent Document 2, a laser beam from each of plural laser oscillating means is branched into plural laser beams to be applied to a workpiece. In this case, the amount of movement of the laser applying position and/or the workpiece can be reduced as compared with the case that the laser applying position is single.

SUMMARY OF THE INVENTION

However, in the case that two laser oscillating means are used and a laser beam from each laser oscillating means is branched into plural laser beams to be applied to a workpiece, there is a problem when any one of the two laser oscillating means becomes abnormal and cannot oscillate a laser beam. That is, the amount of movement of the laser applying position and/or the workpiece is determined on the assumption that both of the two laser oscillating means are normal. Accordingly, when any one of the two laser oscillating means becomes abnormal, the laser applying position cannot be positioned to all of the work lines, so that laser processing cannot be performed on the whole of the workpiece.

In assuming that any one of the two laser oscillating means becomes abnormal and cannot oscillate a laser beam, the amount of movement of the laser applying position and/or the workpiece must be ensured to perform laser processing on the whole of the workpiece, causing an increase in size of a laser processing apparatus. In the case that the laser processing apparatus cannot be increased in size, the operation of the apparatus must be stopped at the time any one of the laser oscillating means becomes abnormal.

It is therefore an object of the present invention to provide a laser processing apparatus which can perform laser processing on the whole of the workpiece with the size of the apparatus reduced even in the case that any one of the plural laser oscillating means becomes abnormal and cannot oscillate a laser beam.

In accordance with an aspect of the present invention, there is provided a laser processing apparatus including a holding table for holding a workpiece; laser applying means for applying a laser beam to the workpiece held on the holding table; and indexing means for relatively moving the holding table and the laser applying means in an indexing direction; the laser applying means including first laser oscillating means; second laser oscillating means; first laser branching means for branching a laser beam oscillated from the first laser oscillating means into a plurality of optical paths; second laser branching means for branching a laser beam oscillated from the second laser oscillating means into a plurality of optical paths; a plurality of first focusing lenses for respectively focusing the laser beams through the plurality of optical paths obtained by the first laser branching means toward the workpiece; and a plurality of second focusing lenses for respectively focusing the laser beams through the plurality of optical paths obtained by the second laser branching means toward the workpiece; the first focusing lenses and the second focusing lenses being alternately arranged in the indexing direction above the holding table.

According to the present invention, the plural first focusing lenses corresponding to the first laser oscillating means and the plural second focusing lenses corresponding to the second laser oscillating means are alternately arranged in the indexing direction. Accordingly, the distance between the focusing lenses located at the opposite ends of the array of the plural focusing lenses corresponding to each laser oscillating means can be made longer than that in a prior art configuration such that a plurality of focusing lenses corresponding to each laser oscillating means are juxtaposed. With the configuration of the present invention, in the case that either the first laser oscillating means or the second laser oscillating means becomes abnormal and cannot oscillate a laser beam, it is possible to suppress an increase in the amount of relative movement of the holding table and the laser applying means in the indexing direction by the indexing means. Accordingly, laser processing can be performed on the whole of the workpiece with the size of the apparatus reduced.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 13 is a schematic side view for illustrating the configuration of laser applying means according to still another modification of the preferred embodiment.

DETAILED DESCRIPTION OF THE PREFERRED EMBODIMENT

Figure 1:
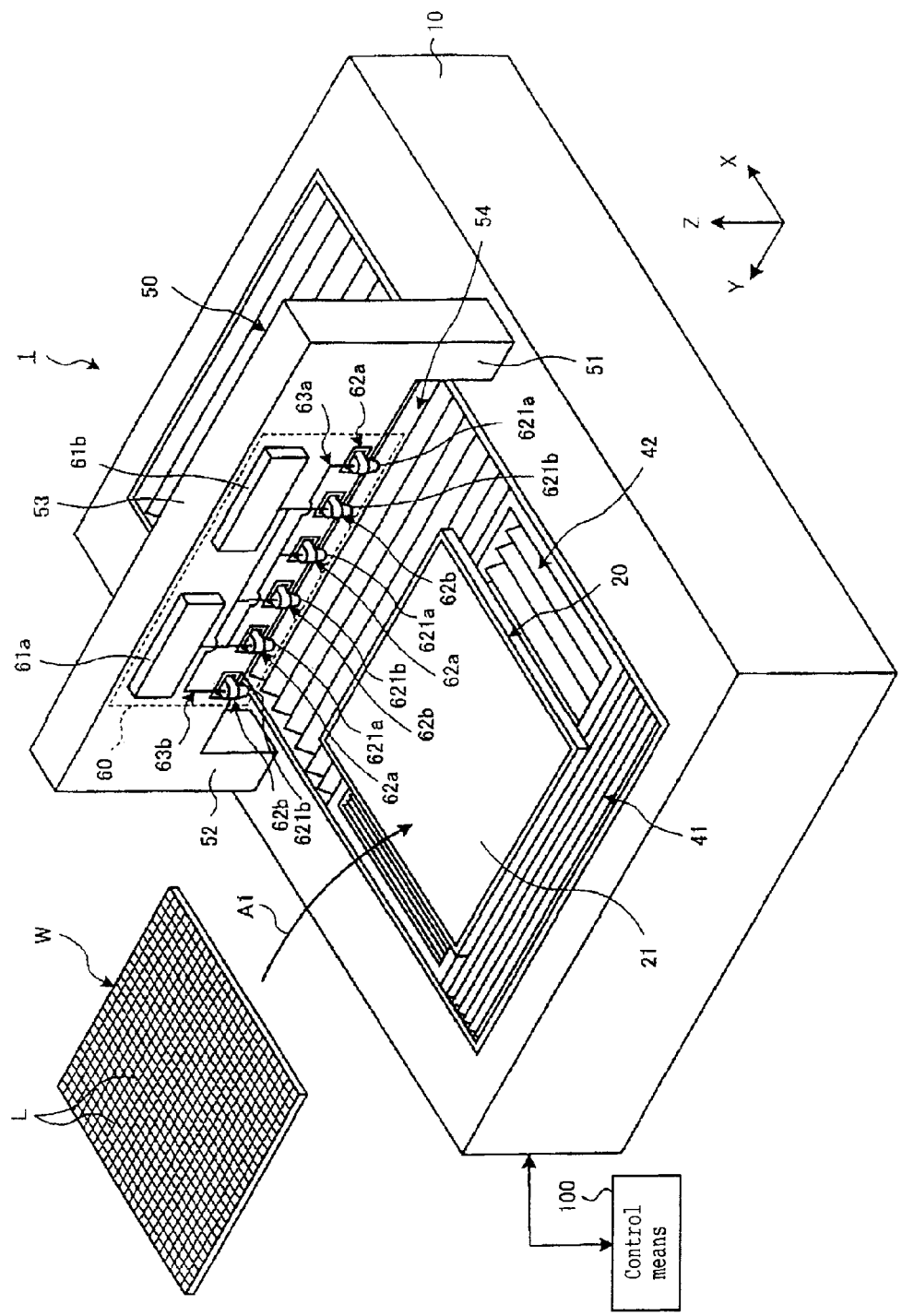
FIG. 1 is a schematic perspective view for illustrating the configuration of an essential part of a laser processing apparatus according to a preferred embodiment of the present invention and the configuration of a glass substrate as an example of the workpiece to be laser-processed by the laser processing apparatus.
Figure 2:
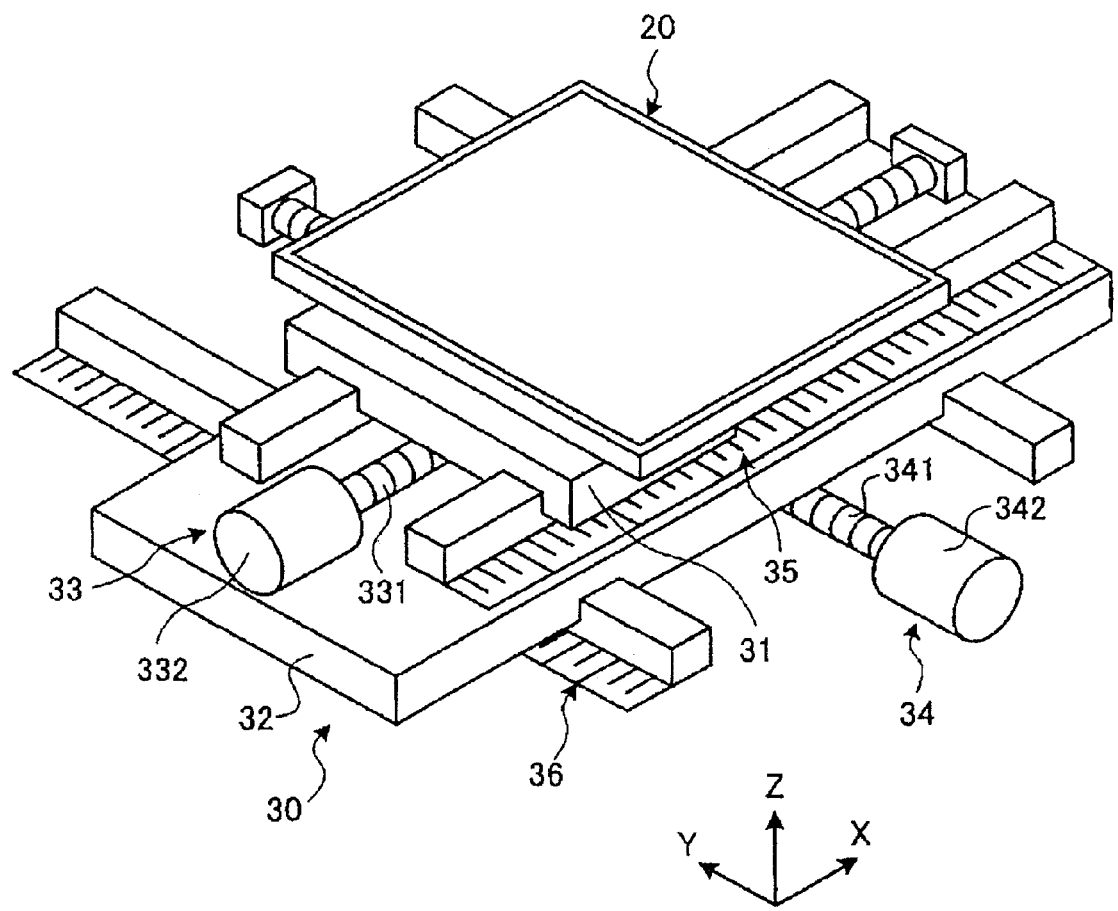
FIG. 2 is a schematic perspective view for illustrating the configuration of holding table driving means.

A preferred embodiment of the laser processing apparatus according to the present invention will now be described with reference to the drawings. FIG. 1 is a schematic perspective view for illustrating the configuration of an essential part of a laser processing apparatus 1 according to a preferred embodiment of the present invention and the configuration of a glass substrate W as an example of the workpiece to be laser-processed by the laser processing apparatus 1. FIG. 2 is a schematic perspective view for illustrating the configuration of holding table driving means 30.

As shown in FIG. 1, the glass substrate W to be laser-processed by the laser processing apparatus 1 is a rectangular platelike glass substrate, for example, and the work surface of the glass substrate W (the upper surface as viewed in FIG. 1) is formed with a plurality of crossing work lines L. The glass substrate W is laser-processed along these work lines L by the laser processing apparatus 1. While the number of the work lines L is not especially limited, the glass substrate W in this preferred embodiment has 24 work lines L extending in a first direction and 24 work lines L extending in a second direction perpendicular to the first direction, wherein all of the work lines L in each direction are equally spaced.

The workpiece in the present invention is not especially limited to such a glass substrate. Examples of the workpiece include a semiconductor wafer such as a silicon wafer, an adhesive member such as DAF (Die Attach Film) provided on the back side of a wafer for chip mounting, a semiconductor product package, an inorganic material substrate of ceramic, glass, sapphire ($Al_2O_3$), etc., various electronic parts such as an LCD driver, and various work materials required to achieve a processing positional accuracy on the order of micrometers.

As shown in FIG. 1, the laser processing apparatus 1 includes a boxlike housing 10. A holding table 20 for holding the glass substrate W is provided on the upper surface of the housing 10. The holding table 20 primarily includes a chuck table having a size corresponding to the size of the glass substrate W. The holding table 20 has a rectangular holding surface 21. The holding table 20 is mounted on a support base (not shown) rotatable about a vertical axis, so that the holding table 20 is rotatable in a horizontal plane by the rotation of the support base.

The glass substrate W is carried to the holding table 20 as shown by an arrow A1 in FIG. 1 by carrying means (not shown) in the condition where the work lines L in either the first direction or the second direction mentioned above extend in a feeding direction defined as an X-axis direction. The glass substrate W thus carried to the holding table 20 is held on the holding surface 21 under suction. The holding table 20 having the holding surface 21 for holding the glass substrate W thereon is movable both in the feeding direction and in an indexing direction defined as a Y-axis direction by the holding table driving means 30 (see FIG. 2) provided in the housing 10. In the following description for the indexing direction as the Y-axis direction, the direction shown by an arrow in each drawing will be referred to as a positive direction, and the direction opposite to this positive direction will be referred to as a negative direction.

As shown in FIG. 2, the holding table driving means 30 includes two sliding blocks 31 and 32 arranged on the upper and lower stages. The holding table 20 is mounted on these two sliding blocks 31 and 32 through the support base (not shown) mentioned above. The sliding block 31 is movable in the feeding direction by feeding means 33 including a ball screw 331 and a pulse motor 332. The feeding means 33 is driven to move the sliding block 31, thereby moving the holding table 20 in the feeding direction relative to laser applying means 60 to be hereinafter described. Thus, the holding table 20 mounted on the sliding block 31 and the laser applying means 60 are relatively moved in the feeding direction.

On the other hand, the sliding block 32 is movable in the indexing direction by indexing means 34 including a ball screw 341 and a pulse motor 342. The indexing means 34 is driven to move the sliding block 32, thereby moving the holding table 20 in the indexing direction relative to the laser applying means 60. Thus, the holding table 20 mounted on the sliding block 32 and the laser applying means 60 are relatively moved in the indexing direction.

As described later in detail, the amount of movement of the holding table 20 in the indexing direction by the indexing means 34 is set on the assumption that any one of first and second laser oscillating means 61a and 61b constituting the laser applying means 60 becomes abnormal and cannot oscillate a laser beam. Accordingly, the indexing means 34 is configured so that it can realize the movement of the holding table 20 by the above-mentioned amount of movement.

The feeding means 33 is provided with feed amount detecting means 35 for detecting the feed amount of the holding table 20. The feed amount detecting means 35 includes a linear scale extending in the feeding direction and a read head provided on the sliding block 31 for reading the linear scale in moving with the sliding block 31. Similarly, the indexing means 34 is provided with index amount detecting means 36 for detecting the index amount of the holding table 20. The index amount detecting means 36 includes a linear scale extending in the indexing direction and a read head provided on the sliding block 32 for reading the linear scale in moving with the sliding block 32.

As shown in FIG. 1, the holding table driving means 30 provided in the housing 10 is covered with first bellows means 41 and second bellows means 42. The first bellows means 41 extends in the feeding direction on the upper surface of the housing 10 and is adapted to expand and contract in concert with the movement of the holding table 20 in the feeding direction. The second bellows means 42 extends in the indexing direction on the upper surface of the housing 10 and is adapted to expand and contract in concert with the movement of the holding table 20 in the indexing direction.

The laser processing apparatus 1 further includes a gantry-shaped support frame 50 provided on the upper surface of the housing 10 so as to span the holding table driving means 30. The support frame 50 is composed of first and second column portions 51 and 52 standing on the upper surface of the housing 10 so as to be opposed to each other on the opposite sides of the first bellows means 41 and a support portion 53 extending in the indexing direction so as to connect the upper ends of the first and second column portions 51 and 52. The gantry-shaped support frame 50 is formed at its central portion with an opening 54 for allowing the movement of the holding table 20. That is, the opening 54 is defined by the first and second column portions 51 and 52 and the support portion 53.

The laser applying means 60 for laser-processing the glass substrate W held on the holding surface 21 is mounted on one side surface of the support portion 53 of the support frame 50 (on the front surface of the support portion 53 as viewed in FIG. 1). The laser applying means 60 includes two laser oscillating means 61a and 61b, i.e., the first laser oscillating means 61a and the second laser oscillating means 61b, three first focusing means 62a corresponding to the first laser oscillating means 61a, three second focusing means 62b corresponding to the second laser oscillating means 61b, first laser branching means 63a corresponding to the first laser oscillating means 61a, and second laser branching means 63b corresponding to the second laser oscillating means 61b. These totally six first and second focusing means 62a and 62b simultaneously apply laser beams to the glass substrate W held on the holding surface 21.

Each of the first and second laser oscillating means 61a and 61b functions to oscillate a laser beam having a predetermined wavelength for laser-processing the glass substrate W. For example, each of the first and second laser oscillating means 61a and 61b is provided by a laser beam oscillator such as a YAG laser oscillator and a YVO4 laser oscillator.

Each of the three first focusing means 62a includes a first focusing lens 621a opposed to the work surface (upper surface) of the glass substrate W held on the holding surface 21, and functions to focus the laser beam oscillated by the first laser oscillating means 61a toward the glass substrate W held on the holding surface (see FIG. 3 to be hereinafter referred to). Each first focusing lens 621a can be finely adjusted in its Z position by a Z-position adjusting mechanism (not shown), thereby adjusting the focal position of the laser beam. Further, each first focusing lens 621a can be finely adjusted in its Y position by a Y-position adjusting mechanism (not shown), thereby adjusting a laser beam applying position in the indexing direction according to the pitch of the work lines L extending in the feeding direction.

Figure 3:
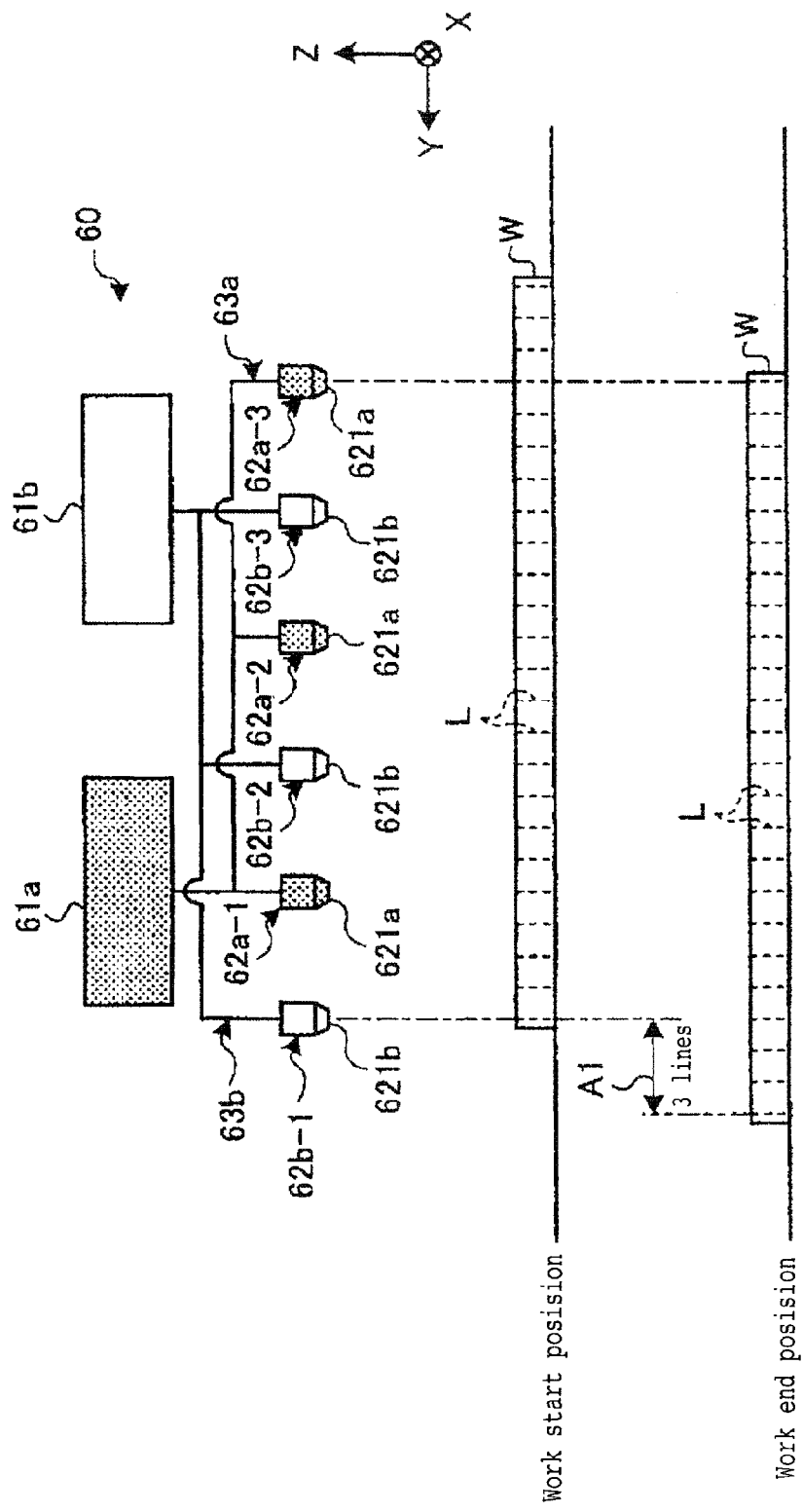
FIG. 3 is a schematic side view for illustrating a laser processing step in the case that both of first laser oscillating means and second laser oscillating means constituting laser applying means according to the preferred embodiment are normal.

Similarly, each of the three second focusing means 62b includes a second focusing lens 621b opposed to the work surface (upper surface) of the glass substrate W held on the holding surface 21, and functions to focus the laser beam oscillated by the second laser oscillating means 61b toward the glass substrate W held on the holding surface 21 (see FIG. 3). Each second focusing lens 621b can be finely adjusted in its Z position by a Z-position adjusting mechanism (not shown), thereby adjusting the focal position of the laser beam. Further, each second focusing lens 621b can be finely adjusted in its Y position by a Y-position adjusting mechanism (not shown), thereby adjusting a laser beam applying position in the indexing direction according to the pitch of the work lines L extending in the feeding direction.

These totally six first and second focusing means 62a and 62b are located along the lower end of the support portion 53 on one side surface thereof (on the front surface as viewed in FIG. 1) so as to be alternately arranged in a line in the indexing direction in such a manner that any one of the three first focusing means 62a is adjacent to any one of the three second focusing means 62b. More specifically, these totally six first and second focusing means 62a and 62b are alternately arranged in a line so as to be spaced at predetermined intervals so that the work lines L extending in the feeding direction are positioned directly below the first and second focusing means 62a and 62b at one time. In this preferred embodiment, the pitch of the first and second focusing means 62a and 62b is set so that three work lines L fall between any adjacent ones of the first and second focusing means 62a and 62b as shown in FIG. 3.

Each of the first and second laser branching means 63a and 63b is provided by an optical fiber in this preferred embodiment, and functions to branch the laser beam oscillated by the corresponding first or second laser oscillating means 61a or 61b into three optical paths and to introduce the resultant laser beams through the three optical paths to the corresponding three first or second focusing lenses 621a or 621b. More specifically, the first laser branching means 63a has a light entrance end fixed to the first laser oscillating means 61a and three branched light emergence ends respectively fixed to the upper ends of the three first focusing means 62a so that each light emergence end is opposed to the corresponding first focusing lens 621a of each first focusing means 62a. Similarly, the second laser branching means 63b has a light entrance end fixed to the second laser oscillating means 61b and three branched light emergence ends respectively fixed to the upper ends of the three second focusing means 62b so that each light emergence end is opposed to the corresponding second focusing lens 621b of each second focusing means 62b. The first and second laser branching means 63a and 63b are not limited to such optical fibers in the present invention. For example, the first and second laser branching means 63a and 63b may be configured by suitably combining optical components such as beam splitters and total reflection mirrors which can branch the laser beam from each of the first and second laser oscillating means 61a and 61b into three optical paths and can introduce the resultant laser beams through the three optical paths to the corresponding three first or second focusing lenses 621a or 621b.

The laser processing apparatus 1 is provided with control means 100. The control means 100 is provided by a microcomputer including a memory storing various data required for the operation of the laser processing apparatus 1. The control means 100 controls the operation of various components of the laser processing apparatus 1 to centrally control the laser processing apparatus 1. That is, the control means 100 controls the operation of the laser processing apparatus 1 to perform a laser processing step such that the work lines L extending in the feeding direction on the glass substrate W held on the holding surface 21 are subjected to laser processing. More specifically, the feeding means 33 and the indexing means 34 are driven to position the work lines L extending in the feeding direction directly below the totally six first and second focusing means 62a and 62b. Thereafter, the first laser oscillating means 61a and the second laser oscillating means 61b are driven as further driving the feeding means 33 to move the holding table 20 in the feeding direction, thereby applying the laser beams from the totally six first and second focusing means 62a and 62b to the six work lines L extending in the feeding direction at one time. Thereafter, the indexing means 34 is driven to index the holding table 20 in the indexing direction, thereby positioning the next six work lines L respectively adjacent to the previous six work lines L extending in the feeding direction directly below the totally six first and second focusing means 62a and 62b. Thereafter, the first and second laser oscillating means 61a and 61b are driven to similarly perform laser processing along these next six work lines L. After similarly performing this laser processing along the other work lines L extending in the feeding direction, the holding table 20 is rotated 90° to change the orientation of the glass substrate W so that the work lines L in the second direction extends in the feeding direction. Thereafter, laser processing is similarly performed along these work lines L in the second direction.

In the case that either the first laser oscillating means 61a or the second laser oscillating means 61b becomes abnormal and cannot oscillate a laser beam in the laser processing apparatus 1, the amount of movement of the holding table 20 in the indexing direction required to laser-process all of the work lines L can be reduced as compared with that in the prior art apparatus.

Figure 4:
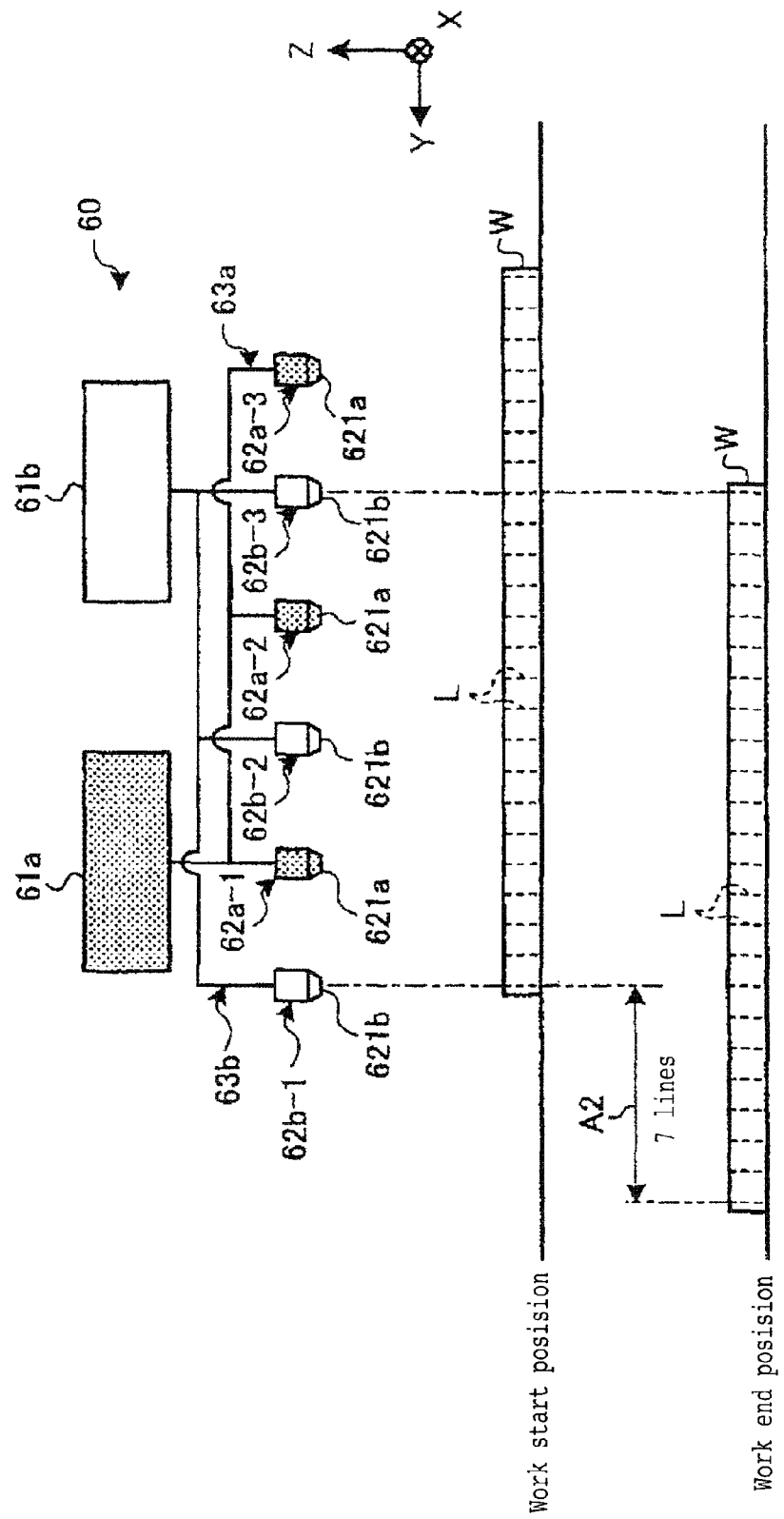
FIG. 4 is a view similar to FIG. 3, showing the case that the first laser oscillating means is abnormal.
Figure 5:
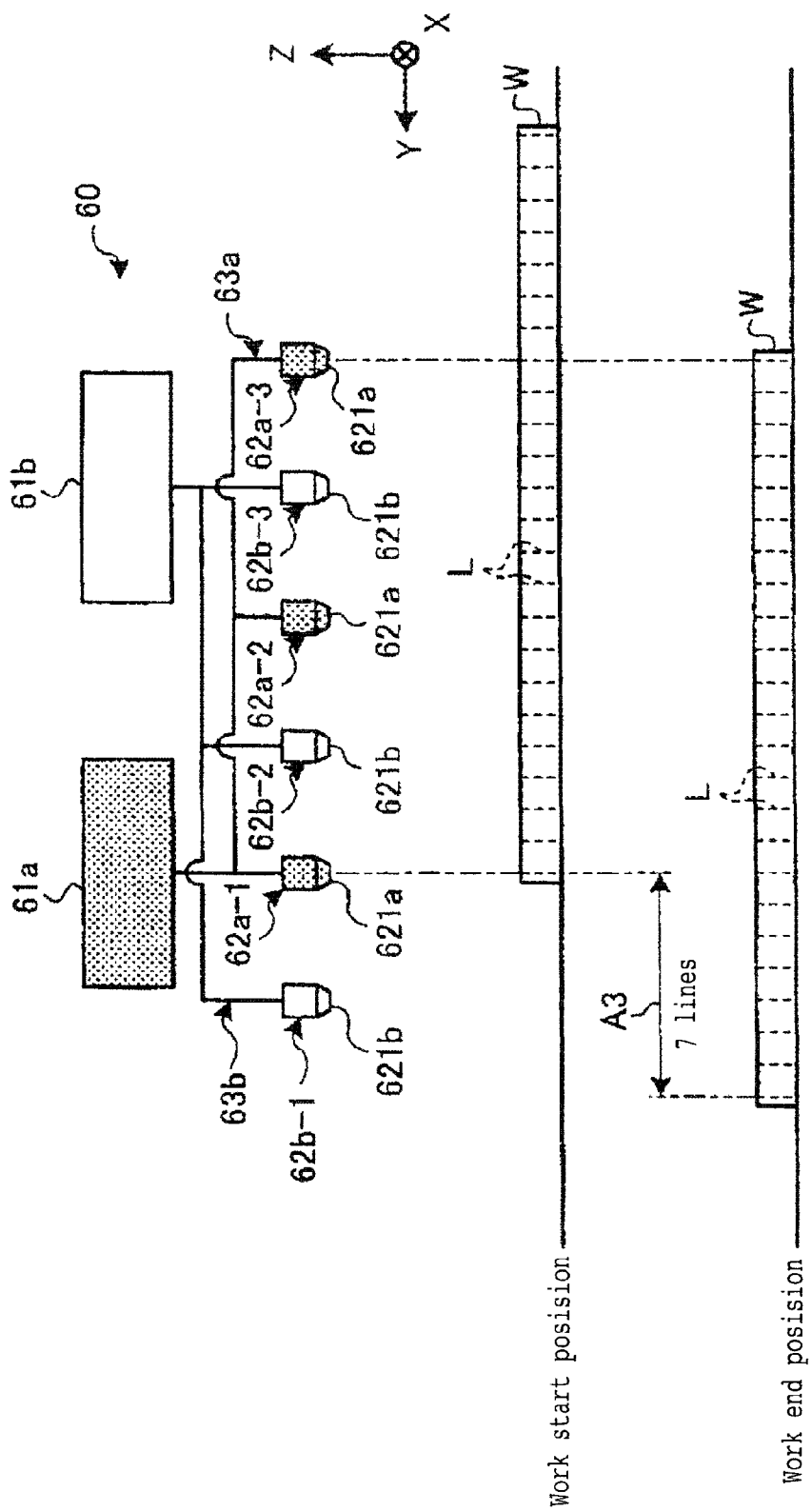
FIG. 5 is a view similar to FIG. 3, showing the case that the second laser oscillating means is abnormal.

FIG. 3 is a schematic side view for illustrating a laser processing step in the case that both of the first laser oscillating means 61a and the second laser oscillating means 61b constituting the laser applying means 60 are normal. FIG. 4 is a view similar to FIG. 3, showing the case that the first laser oscillating means 61a is abnormal, and FIG. 5 is a view similar to FIG. 3, showing the case that the second laser oscillating means 61b is abnormal. In FIGS. 3 to 5, the laser applying means 60 and the glass substrate W to be laser-processed by the laser applying means 60 are viewed in the feeding direction (X-axis direction). Further, in FIGS. 3 to 5, the first laser oscillating means 61a and the three first focusing means 62a corresponding to the first laser oscillating means 61a are shaded for the purposes of discrimination from the second laser oscillating means 61b and the three second focusing means 62b corresponding to the second laser oscillating means 61b. Furthermore, the three first focusing means 62a are discriminated as first focusing means 62a-1, 62a-2, and 62a-3 arranged in this order from the left side as viewed in FIGS. 3 to 5. Similarly, the three second focusing means 62b are discriminated as second focusing means 62b-1, 62b-2, and 62b-3 arranged in this order from the left side as viewed in FIGS. 3 to 5.

In the case that both of the first and second laser oscillating means 61a and 61b are normal, a work start position is shown as the upper position of the glass substrate W in FIG. 3, wherein the leftmost work line L of the glass substrate W is positioned directly below the second focusing means 62b-1 located at the left position as viewed in FIG. 3. On the other hand, a work end position is shown as the lower position of the glass substrate W in FIG. 3, wherein the rightmost work line L of the glass substrate W is positioned directly below the first focusing means 62a-3 located at the right position as viewed in FIG. 3. The holding table 20 is moved stepwise in the indexing direction from the work start position to the work end position in performing the laser processing, thereby laser-processing all of the work lines L. In other words, the distance corresponding to the three-line spacings of the work lines L in the positive Y-axis direction from the work start position as shown by an arrow A1 in FIG. 3 must be ensured as the amount of movement of the holding table 20 to perform the laser processing along all of the work lines L.

In the case that the first laser oscillating means 61a becomes abnormal and cannot oscillate a laser beam, the second focusing means 62b-1, 62b-2, and 62b-3 corresponding to the second laser oscillating means 61b must be used to apply the laser beams from the second focusing means 62b-1, 62b-2, and 62b-3 to all of the work lines L. In this case, a work start position is shown as the upper position of the glass substrate W in FIG. 4, wherein the leftmost work line L of the glass substrate W is positioned directly below the second focusing means 62b-1 located at the left position as viewed in FIG. 4. On the other hand, a work end position is shown as the lower position of the glass substrate W in FIG. 4, wherein the rightmost work line L of the glass substrate W is positioned directly below the second focusing means 62b-3 located at the right position as viewed in FIG. 4. The holding table 20 is moved stepwise in the indexing direction from the work start position to the work end position in performing the laser processing, thereby laser-processing all of the work lines L. In other words, the distance corresponding to the seven-line spacings of the work lines L in the positive Y-axis direction from the work start position as shown by an arrow A2 in FIG. 4 must be ensured as the amount of movement of the holding table 20 to perform the laser processing along all of the work lines L. In this case, the amount of movement of the holding table 20 is equivalent to the sum of the amount of movement of the holding table 20 in the case that both of the first and second laser oscillating means 61a and 61b are normal as shown in FIG. 3 and the distance corresponding to the four-line spacings of the work lines L in the positive Y-axis direction.

In the case that the second laser oscillating means 61b becomes abnormal and cannot oscillate a laser beam, the first focusing means 62a-1, 62a-2, and 62a-3 corresponding to the first laser oscillating means 61a must be used to apply the laser beams from the first focusing means 62a-1, 62a-2, and 62a-3 to all of the work lines L. In this case, a work start position is shown as the upper position of the glass substrate W in FIG. 5, wherein the leftmost work line L of the glass substrate W is positioned directly below the first focusing means 62a-1 located at the left position as viewed in FIG. 5. On the other hand, a work end position is shown as the lower position of the glass substrate W in FIG. 5, wherein the rightmost work line L of the glass substrate W is positioned directly below the first focusing means 62a-3 located at the right position as viewed in FIG. 5. The holding table 20 is moved stepwise in the indexing direction from the work start position to the work end position in performing the laser processing, thereby laser-processing all of the work lines L. In other words, the distance corresponding to the seven-line spacings of the work lines L in the positive Y-axis direction from the work start position as shown by an arrow A3 in FIG. 5 must be ensured as the amount of movement of the holding table 20 to perform the laser processing along all of the work lines L. In this case, the amount of movement of the holding table 20 is equivalent to the sum of the amount of movement of the holding table 20 in the case that both of the first and second laser oscillating means 61a and 61b are normal as shown in FIG. 3 and the distance corresponding to the four-line spacings of the work lines L in the negative Y-axis direction.

In assuming both of the case that the first laser oscillating means 61a becomes abnormal and cannot oscillate a laser beam and the case that the second laser oscillating means 61b becomes abnormal and cannot oscillate a laser beam, it is necessary to ensure the distance from the condition that the leftmost work line L of the glass substrate W is positioned directly below the first focusing means 62a-1 as shown by the upper position of the glass substrate W in FIG. 5 to the condition that the rightmost work line L of the glass substrate W is positioned directly below the second focusing means 62b-3 as shown by the lower position of the glass substrate W in FIG. 4. That is, it is necessary to ensure the distance obtained by adding the distance corresponding to the four-line spacings of the work lines L in the negative Y-axis direction and the distance corresponding to the four-line spacings of the work lines L in the positive Y-axis direction to the distance required in the case that both of the first and second laser oscillating means 61a and 61b are normal. The indexing means 34 is so configured as to allow this distance as the amount of movement of the holding table 20.

In this preferred embodiment as shown in FIGS. 3 to 5, the amount of movement of the holding table 20 is determined on the precondition that the first and second focusing means 62a and 62b are arranged at given intervals such that the three work lines L extending in the feeding direction fall between any adjacent ones of the first and second focusing means 62a and 62b. While the number of lines for the work lines L between any adjacent ones of the first and second focusing means 62a and 62b is not limited to three, the amount of movement of the holding table 20 must be determined in consideration of the number of lines between any adjacent ones of the first and second focusing means 62a and 62b.

Figure 6:
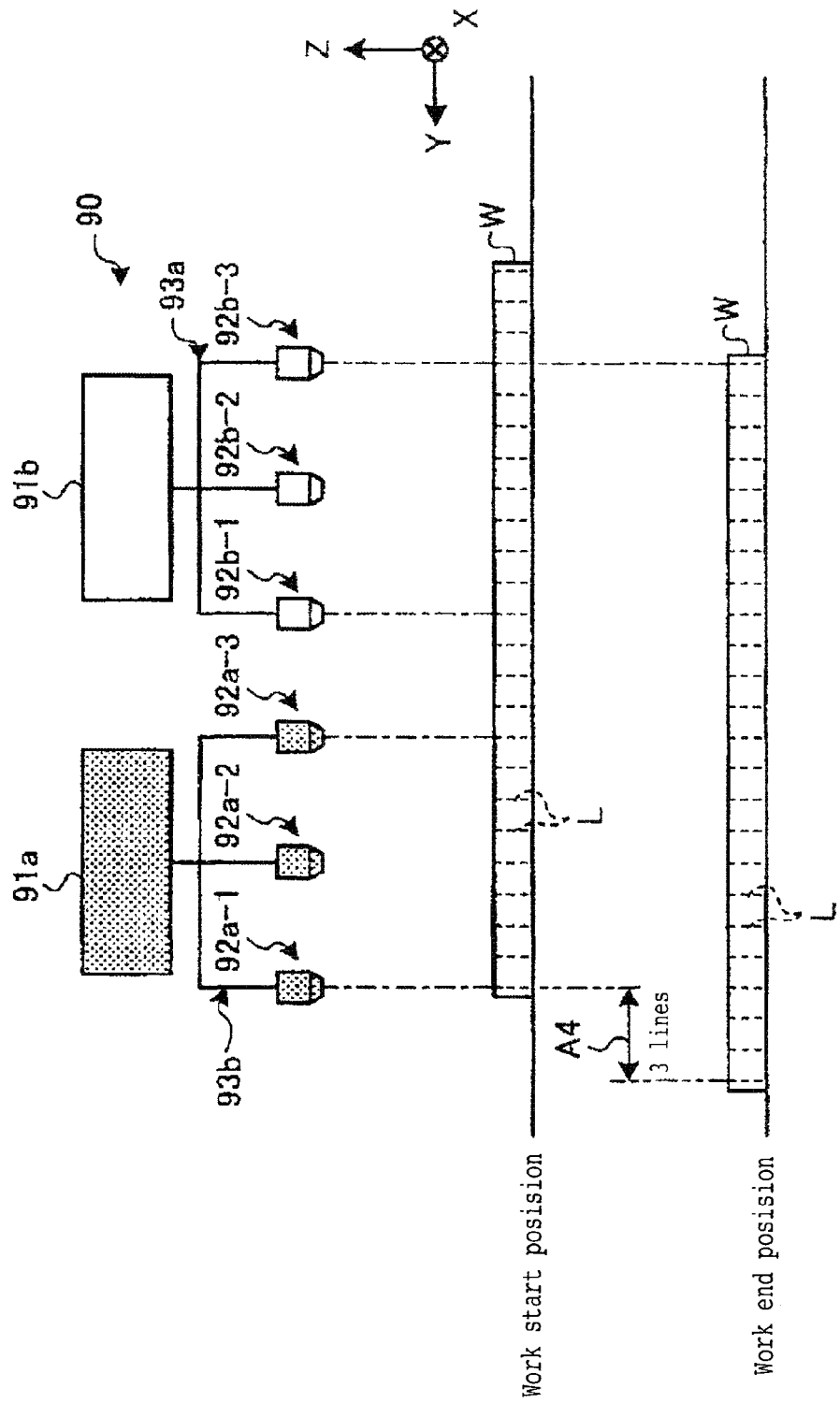
FIG. 6 is a schematic side view for illustrating a laser processing step in the case that both of first laser oscillating means and second laser oscillating means constituting laser applying means in the prior art are normal.
Figure 7:
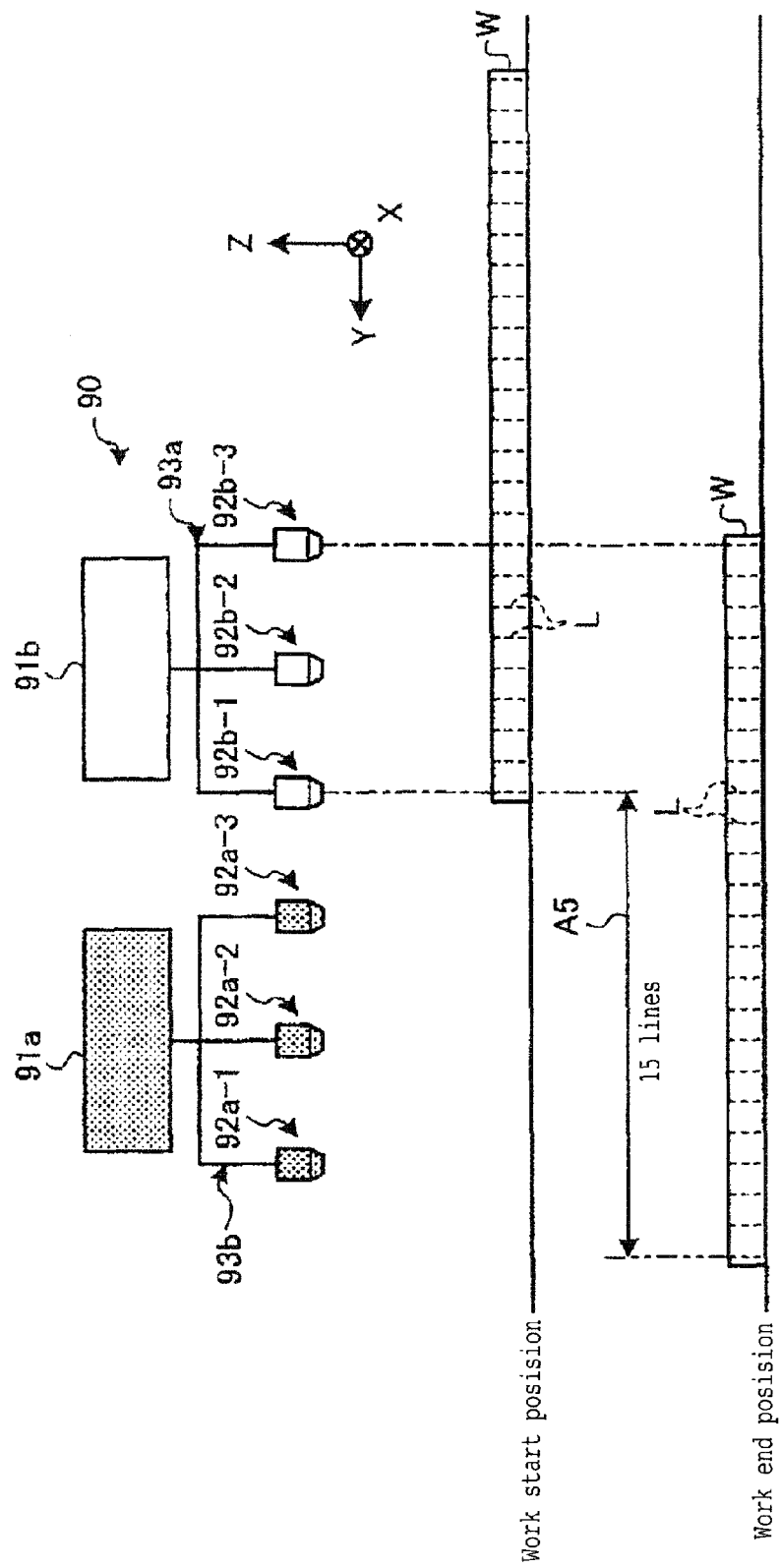
FIG. 7 is a view similar to FIG. 6, showing the case that the first laser oscillating means in the prior art is abnormal.
Figure 8:
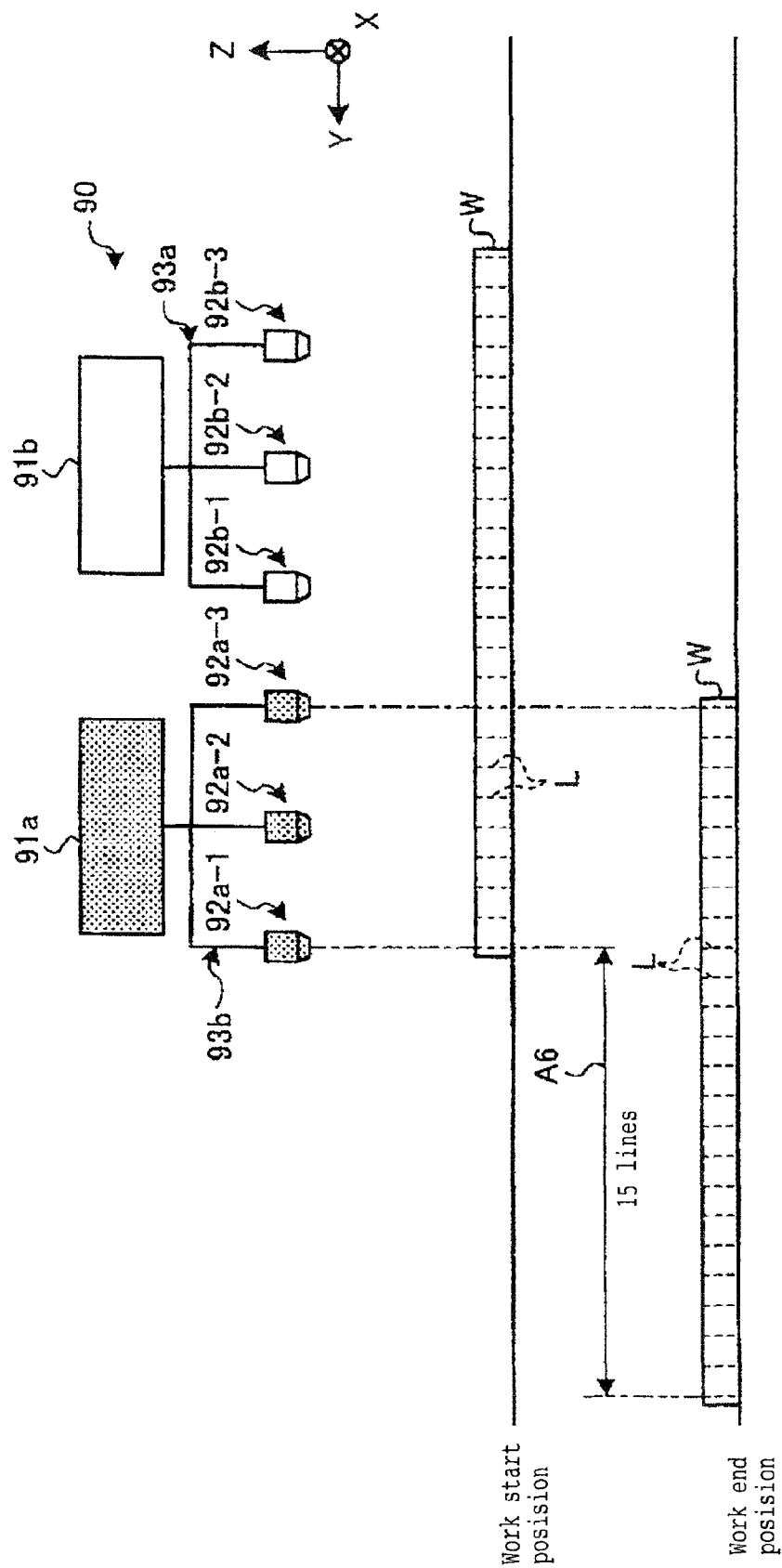
FIG. 8 is a view similar to FIG. 6, showing the case that the second laser oscillating means in the prior art is abnormal.

There will now be described the configuration of a prior art apparatus. FIG. 6 is a schematic side view for illustrating a laser processing step in the case that both of first laser oscillating means 91a and second laser oscillating means 91b constituting laser applying means 90 in the prior art are normal. FIG. 7 is a view similar to FIG. 6, showing the case that the first laser oscillating means 91a is abnormal, and FIG. 8 is a view similar to FIG. 6, showing the case that the second laser oscillating means 91b is abnormal. In FIGS. 6 to 8, the laser applying means 90 and the glass substrate W to be laser-processed by the laser applying means 90 are viewed in the feeding direction (X-axis direction). Further, in FIGS. 6 to 8, the first laser oscillating means 91a and three first focusing means 92a corresponding to the first laser oscillating means 91a are shaded for the purposes of discrimination from the second laser oscillating means 91b and three second focusing means 92b corresponding to the second laser oscillating means 91b. Further, the three first focusing means 92a are discriminated as first focusing means 92a-1, 92a-2, and 92a-3 arranged in this order from the left side as viewed in FIGS. 6 to 8. Similarly, the three second focusing means 92b are discriminated as second focusing means 92b-1, 92b-2, and 92b-3 arranged in this order from the left side as viewed in FIGS. 6 to 8.

As shown in FIGS. 6 to 8, the group of the first focusing means 92a-1, 92a-2, and 92a-3 corresponding to the first laser oscillating means 91a is located on the left side of the group of the second focusing means 92b-1, 92b-2, and 92b-3 corresponding to the second laser oscillating means 91b. In each group, the first focusing means 92a-1 to 92a-3 are juxtaposed and the second focusing means 92b-1 to 92b-3 are juxtaposed.

In the case that both of the first and second laser oscillating means 91a and 91b are normal, a work start position is shown as the upper position of the glass substrate W in FIG. 6, wherein the leftmost work line L of the glass substrate W is positioned directly below the first focusing means 92a-1 located at the left position as viewed in FIG. 6. On the other hand, a work end position is shown as the lower position of the glass substrate W in FIG. 6, wherein the rightmost work line L of the glass substrate W is positioned directly below the second focusing means 92b-3 located at the right position as viewed in FIG. 6. The holding table 20 is moved stepwise in the indexing direction from the work start position to the work end position in performing the laser processing, thereby laser-processing all of the work lines L. In other words, the distance corresponding to the three-line spacings of the work lines L in the positive Y-axis direction from the work start position as shown by an arrow A4 in FIG. 6 must be ensured as the amount of movement of the holding table 20 to perform the laser processing along all of the work lines L. In this manner, in the case that both of the first and second laser oscillating means 91a and 91b are normal, the amount of movement of the holding table 20 is the same as that in this preferred embodiment described above with reference to FIG. 3.

In the case that the first laser oscillating means 91a becomes abnormal and cannot oscillate a laser beam, the second focusing means 92b-1, 92b-2, and 92b-3 corresponding to the second laser oscillating means 91b must be used to apply the laser beams from the second focusing means 92b-1, 92b-2, and 92b-3 to all of the work lines L. In the prior art configuration shown in FIGS. 6 to 8, the distance between the second focusing means 92b-1 and 92b-3 located at the opposite positions is shorter than the distance between the second focusing means 62b-1 and 62b-3 located at the opposite positions in this preferred embodiment shown in FIGS. 3 to 5. Accordingly, the amount of movement of the holding table 20 in the prior art configuration must be set larger than that in this preferred embodiment.

More specifically, in this case, a work start position is shown as the upper position of the glass substrate W in FIG. 7, wherein the leftmost work line L of the glass substrate W is positioned directly below the second focusing means 92b-1 located at the left position as viewed in FIG. 7. On the other hand, a work end position is shown as the lower position of the glass substrate W in FIG. 7, wherein the rightmost work line L of the glass substrate W is positioned directly below the second focusing means 92b-3 located at the right position as viewed in FIG. 7. The holding table 20 is moved stepwise in the indexing direction from the work start position to the work end position in performing the laser processing, thereby laser-processing all of the work lines L. In other words, the distance corresponding to the fifteen-line spacings of the work lines L in the positive Y-axis direction from the work start position as shown by an arrow A5 in FIG. 7 must be ensured as the amount of movement of the holding table 20 to perform the laser processing along all of the work lines L. In this case, the amount of movement of the holding table 20 is equivalent to the sum of the amount of movement of the holding table 20 in the case that both of the first and second laser oscillating means 91a and 91b are normal as shown in FIG. 6 and the distance corresponding to the twelve-line spacings of the work lines L in the negative Y-axis direction.

In the case that the second laser oscillating means 91b becomes abnormal and cannot oscillate a laser beam, the first focusing means 92a-1, 92a-2, and 92a-3 corresponding to the first laser oscillating means 91a must be used to apply the laser beams from the first focusing means 92a-1, 92a-2, and 92a-3 to all of the work lines L. In the prior art configuration shown in FIGS. 6 to 8, the distance between the first focusing means 92a-1 and 92a-3 located at the opposite positions is shorter than the distance between the first focusing means 62a-1 and 62a-3 located at the opposite positions in this preferred embodiment shown in FIGS. 3 to 5. Accordingly, the amount of movement of the holding table 20 in the prior art configuration must be set larger than that in this preferred embodiment.

More specifically, in this case, a work start position is shown as the upper position of the glass substrate W in FIG. 8, wherein the leftmost work line L of the glass substrate W is positioned directly below the first focusing means 92a-1 located at the left position as viewed in FIG. 8. On the other hand, a work end position is shown as the lower position of the glass substrate W in FIG. 8, wherein the rightmost work line L of the glass substrate W is positioned directly below the first focusing means 92a-3 located at the right position as viewed in FIG. 8. The holding table 20 is moved stepwise in the indexing direction from the work start position to the work end position in performing the laser processing, thereby laser-processing all of the work lines L. In other words, the distance corresponding to the fifteen-line spacings of the work lines L in the positive Y-axis direction from the work start position as shown by an arrow A6 in FIG. 8 must be ensured as the amount of movement of the holding table 20 to perform the laser processing along all of the work lines L. In this case, the amount of movement of the holding table 20 is equivalent to the sum of the amount of movement of the holding table 20 in the case that both of the first and second laser oscillating means 91a and 91b are normal as shown in FIG. 6 and the distance corresponding to the twelve-line spacings of the work lines L in the positive Y-axis direction.

In assuming both of the case that the first laser oscillating means 91a becomes abnormal and cannot oscillate a laser beam and the case that the second laser oscillating means 91b becomes abnormal and cannot oscillate a laser beam, it is necessary to ensure the distance from the condition that the leftmost work line L of the glass substrate W is positioned directly below the second focusing means 92b-1 as shown by the upper position of the glass substrate W in FIG. 7 to the condition that the rightmost work line L of the glass substrate W is positioned directly below the first focusing means 92a-3 as shown by the lower position of the glass substrate W in FIG. 8. That is, it is necessary to ensure the distance obtained by adding the distance corresponding to the twelve-line spacings of the work lines L in the negative Y-axis direction and the distance corresponding to the twelve-line spacings of the work lines L in the positive Y-axis direction to the distance required in the case that both of the first and second laser oscillating means 91a and 91b are normal. Accordingly, the amount of movement of the holding table 20 in the preferred embodiment shown in FIGS. 3 to 5 can be reduced by the distance corresponding to the sixteen-line spacings of the work lines L as compared with that in the prior art shown in FIGS. 6 to 8.

According to this preferred embodiment, the laser beam oscillated by each of the first and second laser oscillating means 61a and 61b is branched into three optical paths. The three laser beams through the three optical paths obtained by the first laser branching means 63a corresponding to the first laser oscillating means 61a are respectively focused by the first focusing lenses 621a of the three first focusing means 62a toward the glass substrate W held on the holding surface 21. At the same time, the three laser beams through the three optical paths obtained by the second laser branching means 63b corresponding to the second laser oscillating means 61b are respectively focused by the second focusing lenses 621b of the three second focusing means 62b. The three first focusing means 62a corresponding to the first laser oscillating means 61a and the three second focusing means 62b corresponding to the second laser oscillating means 61b are alternately arranged in a line. On the assumption that either the first laser oscillating means 61a or the second laser oscillating means 61b becomes abnormal and cannot oscillate a laser beam, the indexing means 34 is so configured as to move the holding table 20 in the indexing direction. According to this preferred embodiment, in the case that either the first laser oscillating means 61a or the second laser oscillating means 61b becomes abnormal as mentioned above, the amount of movement of the holding table 20 can be reduced as compared with that in the prior art. Accordingly, the laser processing apparatus can be reduced in size, and even in the case that either the first laser oscillating means 61a or the second laser oscillating means 61b becomes abnormal, the laser processing can be performed on the whole surface of the glass substrate W (along all of the work lines L).

The configuration that the first focusing means 62a and the second focusing means 62b are alternately arranged according to this preferred embodiment is highly effective in the case that the glass substrate W to be laser-processed has a large size (large width). In the case that the glass substrate W to be laser-processed has a small size, more specifically, in the case that the width of the glass substrate W is smaller than the distance between the second focusing means 62b-1 and the first focusing means 62a-3 located at the opposite positions as viewed in FIG. 3, the laser beams from some of the first and second focusing means 62a and 62b may not be focused toward the glass substrate W. To cope with this problem, more preferably, the configuration that the first and second focusing means 62a and 62b are alternately arranged according to this preferred embodiment and the configuration that the laser beam oscillated by any one of the first and second laser oscillating means 61a and 61b (e.g., the first laser oscillating means 61a) is applied by using a plurality of focusing means juxtaposed as in the prior art may be selectively adopted.

Figure 9:
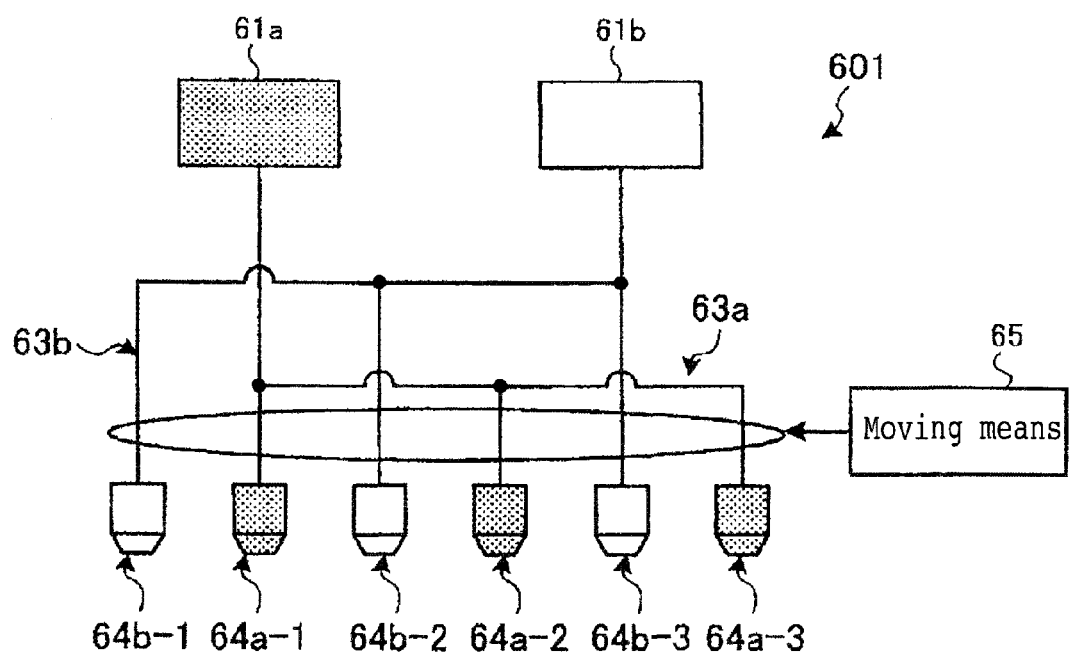
FIG. 9 is a schematic side view for illustrating the configuration of laser applying means according to a modification of the preferred embodiment.
Figure 10:
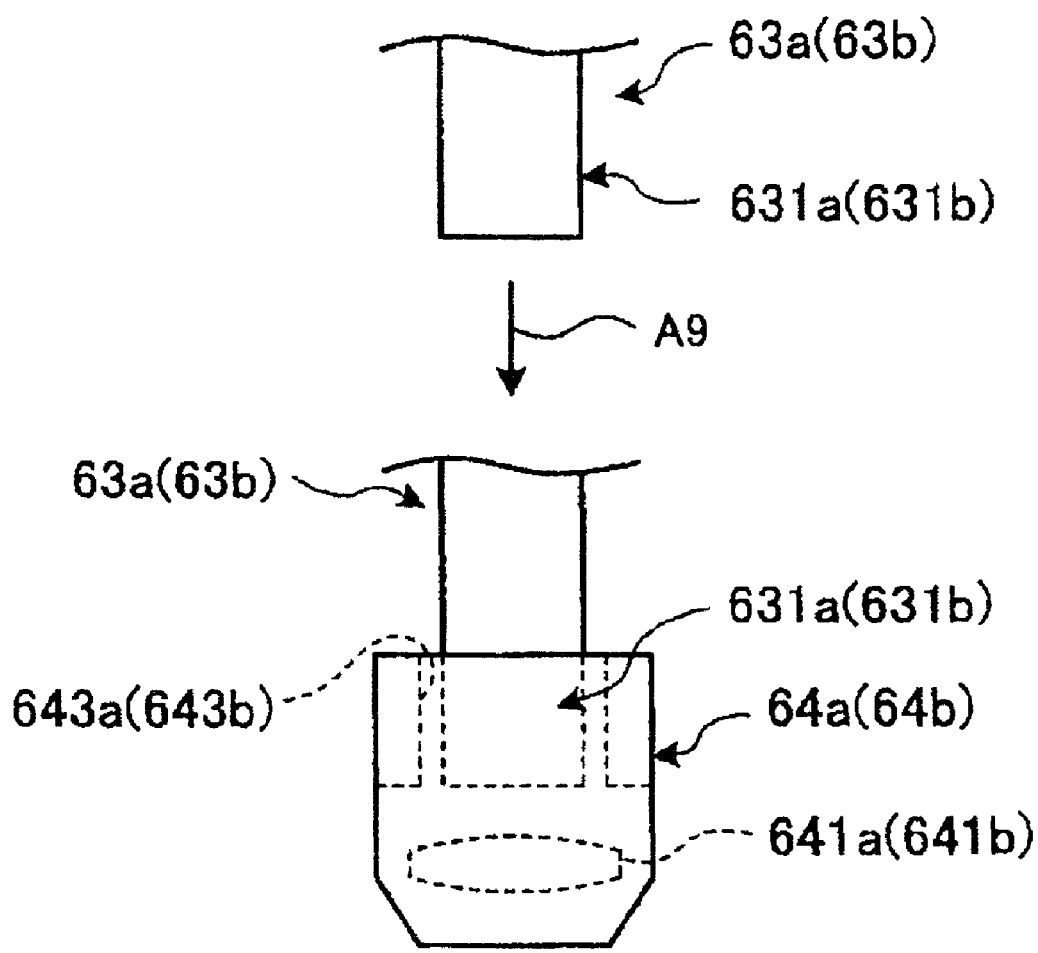
FIG. 10 is an enlarged view for illustrating the configuration of first and second focusing means of the laser applying means shown in FIG. 9.

FIG. 9 is a schematic side view for illustrating the configuration of laser applying means 601 according to a modification of the above preferred embodiment. FIG. 10 is an enlarged view for illustrating the configuration of first and second focusing means 64a and 64b constituting the laser applying means 601 shown in FIG. 9. In FIG. 9, the three first focusing means 64a are discriminated as first focusing means 64a-1, 64a-2, and 64a-3 arranged in this order from the left side as viewed in FIG. 9. Similarly, the three second focusing means 64b are discriminated as second focusing means 64b-1, 64b-2, and 64b-3 arranged in this order from the left side as viewed in FIG. 9. In FIGS. 9 and 10, parts similar to those of the above preferred embodiment are denoted by the same reference symbols.

As shown in FIG. 9, the laser applying means 601 includes moving means 65 for moving light emergence ends 631a and 631b (see FIG. 10) of first and second laser branching means 63a and 63b removably connected to the upper ends of the first focusing means 64a-1 to 64a-3 and the second focusing means 64b-1 to 64b-3.

As shown in FIG. 10, each of the first focusing means 64a is formed at its upper end with an engaging hole 643a for engaging the corresponding light emergence end 631a of the first laser branching means 63a, and includes a first focusing lens 641a located below this engaging hole 643a. Similarly, each of the second focusing means 64b is formed at its upper end with an engaging hole 643b for engaging the corresponding light emergence end 631b of the second laser branching means 63b, and includes a second focusing lens 641b located below this engaging hole 643b. As shown by an arrow A9 in FIG. 10, the light emergence ends 631a and 631b of the first and second laser branching means 63a and 63b are engaged into the engaging holes 643a and 643b of the first and second focusing means 64a and 64b, so that the light emergence ends 631a and 631b are opposed to the first and second focusing lenses 641a and 641b.

As shown in FIG. 9, the moving means 65 functions to individually hold the six light emergence ends 631a and 631b of the first and second laser branching means 63a and 63b and next remove them from the engaging holes 643a and 643b of the first focusing means 64a-1 to 64a-3 and the second focusing means 64b-1 to 64b-3. The moving means 65 further functions to move any selected one of the light emergence ends 631a and 631b removed from the engaging holes 643a and 643b to any selected one of the engaging holes 643a and 643b and next engage this selected light emergence end into this selected engaging hole.

For example, the moving means 65 is driven to disengage the light emergence end 631b of the second laser branching means 63b from the engaging hole 643b of the second focusing means 64b-2 in the condition shown in FIG. 9. Further, the moving means 65 is driven to disengage the light emergence end 631a of the first laser branching means 63a from the engaging hole 643a of the first focusing means 64a-3 in the condition shown in FIG. 9. Thereafter, the moving means 65 moves this light emergence end 631a and engages it into the engaging hole 643b of the second focusing means 64b-2. According to this configuration, the laser beam from the first laser oscillating means 61a can be applied by using the first focusing means 64a-1, the second focusing means 64b-2, and the first focusing means 64a-2 juxtaposed in this order from the left side as viewed in FIG. 9, so that the laser processing can be performed by using only the first laser oscillating means 61a. Accordingly, even in the case that the glass substrate W to be laser-processed has a small size, the laser processing can be efficiently performed.

Figure 11:
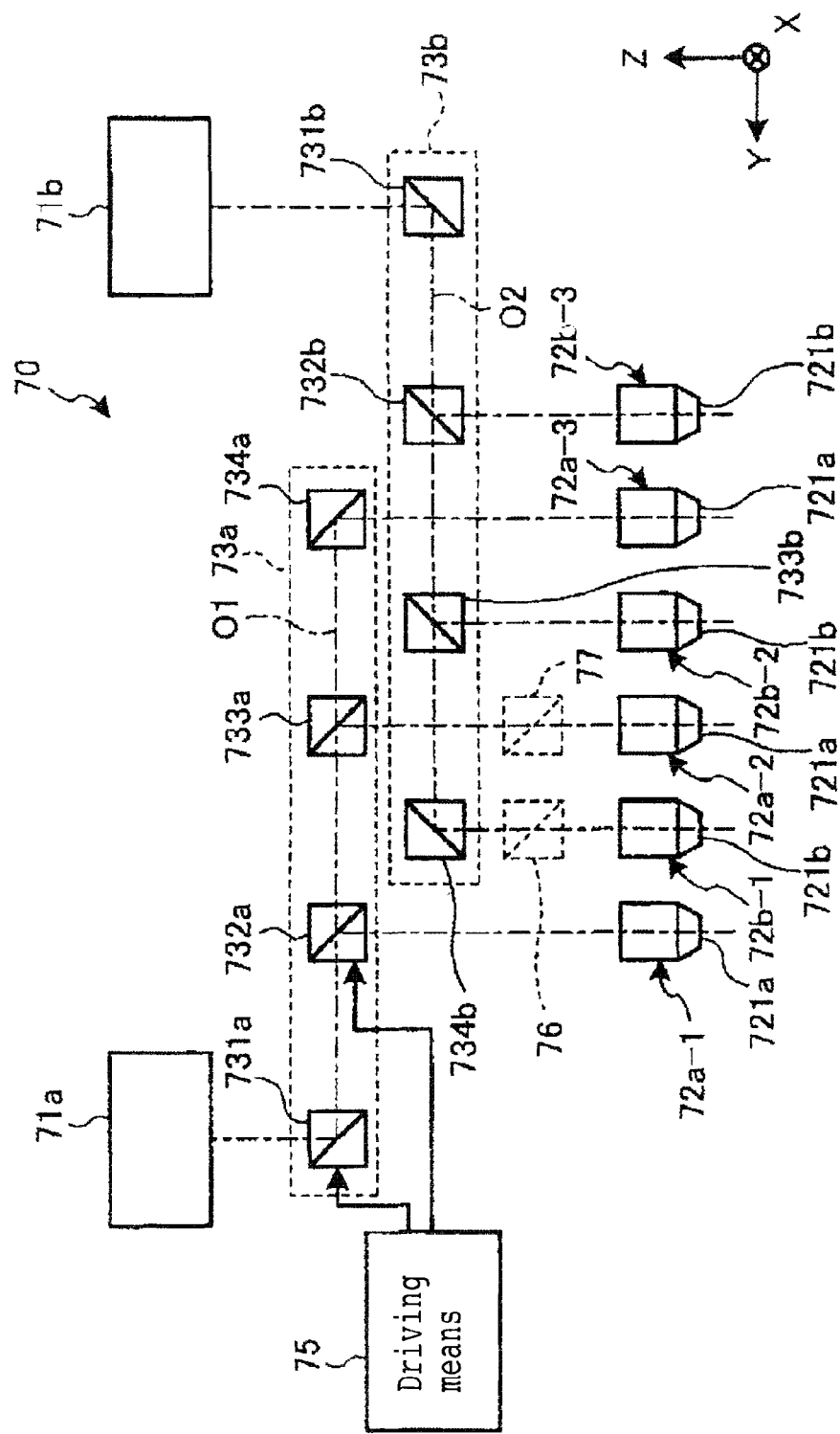
FIG. 11 is a schematic side view for illustrating the configuration of laser applying means according to another modification of the preferred embodiment.
Figure 12:
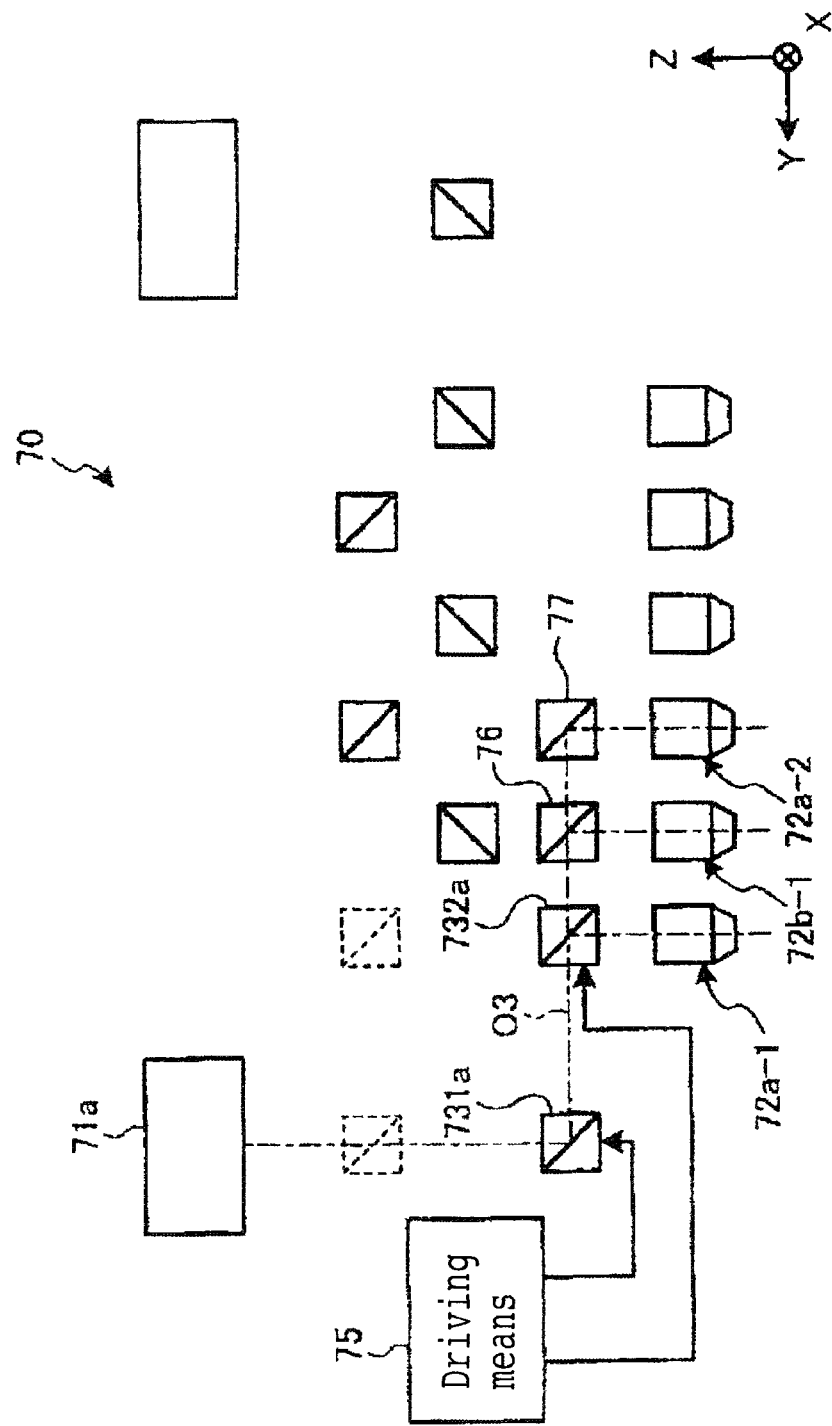
FIG. 12 is a schematic side view for illustrating the configuration of laser applying means according to still another modification of the preferred embodiment.

Also in the configuration according to the modification shown in FIG. 9, the first and second laser branching means 63a and 63b may be provided by optical components suitably located rather than optical fibers. FIGS. 11 and 12 are schematic side views for illustrating the configuration of laser applying means 70 according to another modification of the above preferred embodiment. As shown in FIG. 11, the laser applying means 70 includes first and second laser oscillating means 71a and 71b, three first focusing means 72a-1, 72a-2, and 72a-3 each having a first focusing lens 721a corresponding to the first laser oscillating means 71a, three second focusing means 72b-1, 72b-2, and 72b-3 each having a second focusing lens 721b corresponding to the second laser oscillating means 71b, first laser branching means 73a for introducing a laser beam oscillated by the first laser oscillating means 71a into the three first focusing means 72a-1, 72a-2, and 72a-3, and second laser branching means 73b for introducing a laser beam oscillated by the second laser oscillating means 71b into the three second focusing means 72b-1, 72b-2, and 72b-3.

The first laser branching means 73a includes a total reflection mirror 731a, two beam splitters 732a and 733a, and a total reflection mirror 734a arranged in this order along an optical path O1. The total reflection mirror 731a functions to bend the optical path of the laser beam oscillated by the first laser oscillating means 71a to the optical path O1. The beam splitter 732a functions to reflect ⅓ of the light quantity of the incident laser beam toward the focusing lens 721a of the first focusing means 72a-1 and also to transmit ⅔ of the light quantity of the incident laser beam toward the beam splitter 733a. The beam splitter 733a functions to reflect ½ of the light quantity of the incident laser beam toward the focusing lens 721a of the first focusing means 72a-2 and also to transmit ½ of the light quantity of the incident laser beam toward the total reflection mirror 734a. The total reflection mirror 734a functions to totally reflect the incident laser beam toward the focusing lens 721a of the first focusing means 72a-3.

Similarly, the second laser branching means 73b includes a total reflection mirror 731b, two beam splitters 732b and 733b, and a total reflection mirror 734b arranged in this order along an optical path $O_2$. The total reflection mirror 731b functions to bend the optical path of the laser beam oscillated by the second laser oscillating means 71b to the optical path $O_2$. The beam splitter 732b functions to reflect ⅓ of the light quantity of the incident laser beam toward the focusing lens 721b of the second focusing means 72b-3 and also to transmit ⅔ of the light quantity of the incident laser beam toward the beam splitter 733b. The beam splitter 733b functions to reflect ½ of the light quantity of the incident laser beam toward the focusing lens 721b of the second focusing means 72b-2 and also to transmit ½ of the light quantity of the incident laser beam toward the total reflection mirror 734b. The total reflection mirror 734b functions to totally reflect the incident laser beam toward the focusing lens 721b of the second focusing means 72b-1.

The laser applying means 70 further includes driving means 75 for lowering the total reflection mirror 731a and the beam splitter 732a of the first laser branching means 71a to the positions in a predetermined optical path O3 (see FIG. 12) set below the optical components of the second laser branching means 73b. As shown by broken lines in FIG. 11 and solid lines in FIG. 12, the laser applying means 70 further includes a beam splitter 76 adapted to be moved in the X-axis direction by driving means (not shown) and inserted to the position in the optical path O3 above the second focusing means 72b-1 and a total reflection mirror 77 adapted to be moved in the X-axis direction by driving means (not shown) and inserted to the position in the optical path O3 above the first focusing means 72a-2.

In the case that any one of the first and second laser oscillating means 71a and 71b (e.g., only the first laser oscillating means 71a) is used to perform the laser processing, the driving means 75 is operated to lower the total reflection mirror 731a and the beam splitter 732a to the positions in the optical path O3 as shown in FIG. 12. Further, the driving means (not shown) is operated to insert the beam splitter 76 to the position in the optical path O3 above the second focusing means 72b-1 as shown in FIG. 12, and the driving means (not shown) is operated to insert the total reflection mirror 77 to the position in the optical path O3 above the first focusing means 72a-2 as shown in FIG. 12. With this configuration, the laser beam from the first laser oscillating means 71a can be applied by using the first focusing means 72a-1, the second focusing means 72b-1, and the first focusing means 72a-2 juxtaposed in this order from the left side as viewed in FIG. 12, so that the laser processing can be performed by using only the first laser oscillating means 71a.

In the above preferred embodiment, the two laser oscillating means are provided and the laser beam oscillated by each laser oscillating means is branched into three optical paths. However, three or more laser oscillating means may be provided and the laser beam oscillated by each laser oscillating means may be branched into two or more optical paths. FIG. 13 is a schematic side view for illustrating the configuration of laser applying means 80 according to another modification of the above preferred embodiment. In FIG. 13, the laser applying means 80 and the glass substrate W to be laser-processed by the laser applying means 80 are viewed in the feeding direction (X-axis direction).

The laser applying means 80 shown in FIG. 13 includes three laser oscillating means 81a, 81b, and 81c, i.e., first laser oscillating means 81*a*, second laser oscillating means 81*b*, and third laser oscillating means 81*c*, two first focusing means 82*a* corresponding to the first laser oscillating means 81*a*, two second focusing means 82*b* corresponding to the second laser oscillating means 81*b*, two third focusing means 82*c* corresponding to the third laser oscillating means 81*c*, first laser branching means 83*a* corresponding to the first laser oscillating means 81*a*, second laser branching means 83*b* corresponding to the second laser oscillating means 81*b*, and third laser branching means 83*c* corresponding to the third laser oscillating means 81*c*. The configuration of each component is similar to that of the above preferred embodiment. That is, the first, second, and third focusing means 82*a*, 82*b*, and 82*c* respectively include first, second, and third focusing lenses 821*a*, 821*b*, and 821*c* opposed to the work surface (upper surface) of the glass substrate W, and the laser beams oscillated by the first, second, and third laser oscillating means 81*a*, 81*b*, and 81*c* are focused by the first, second, and third focusing means 82*a*, 82*b*, and 82*c* toward the glass substrate W. Also in this configuration, effects similar to those of the above preferred embodiment can be exhibited.

In the above preferred embodiment, the holding table 20 is moved in the indexing direction to thereby relatively move the holding table 20 and the laser applying means 60. As a modification, the laser applying means 60 may be moved in the indexing direction without moving the holding table 20. In this case, the laser processing apparatus is configured by preliminarily assuming the amount of movement of the laser applying means 60. As another modification, both of the holding table 20 and the laser applying means 60 may be moved oppositely in the indexing direction to thereby attain the relative movement. In this case, the laser processing apparatus is configured by preliminarily assuming the amount of movement of the holding table 20 and the amount of movement of the laser applying means 60.

As described above, the laser processing apparatus of the present invention is suitable for laser processing of the whole of a workpiece with the size of the apparatus reduced in the case that any one of a plurality of laser oscillating means in the apparatus becomes abnormal and cannot oscillate a laser beam.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing apparatus, comprising:
 a holding table for holding a workpiece having a plurality of work lines;
 laser applying means for applying a laser beam to the workpiece held on the holding table; and
 indexing means for relatively moving the holding table and the laser applying means in an indexing direction;
 said laser applying means including
  first laser oscillating means,
  second laser oscillating means,
  first laser branching means for branching a laser beam oscillated from the first laser oscillating means into a plurality of optical paths,
  second laser branching means for branching a laser beam oscillated from the second laser oscillating means into a plurality of optical paths,
  a plurality of first focusing lenses for respectively focusing the laser beams through the plurality of optical paths obtained by the first laser branching means toward the workpiece, and
  a plurality of second focusing lenses for respectively focusing the laser beams through the plurality of optical paths obtained by the second laser branching means toward the workpiece,
 the first focusing lenses and the second focusing lenses being alternately arranged in the indexing direction above the holding table,
 wherein each of the plurality of optical paths is simultaneously focused towards one of the plurality of work lines.

\* \* \* \* \*